United States Patent [19]

Krushinski et al.

[11] Patent Number: 5,007,950
[45] Date of Patent: Apr. 16, 1991

[54] COMPRESSED, WEDGED FLOAT GLASS BOTTOM STRUCTURE

[75] Inventors: Bert K. Krushinski, Murrysville, Pa.; Robert A. Lawhon, Chehalis, Wash.; Francis A. Radecki, Ross Township, Allegheny County, Pa.; Ronald L. Schwenninger, Ridgely, W. Va.

[73] Assignee: PPG Industries, Inc., Pittsburgh, Pa.

[21] Appl. No.: 455,046

[22] Filed: Dec. 22, 1989

[51] Int. Cl.$^5$ .............................................. C03B 18/02
[52] U.S. Cl. ..................................... 65/182.5; 65/347
[58] Field of Search .................. 65/182.5, 336, 346, 65/347

[56] References Cited

U.S. PATENT DOCUMENTS

| | | | |
|---|---|---|---|
| 3,393,061 | 7/1968 | Greenler et al. | 65/182.5 X |
| 3,427,142 | 2/1969 | De Lajarte | 65/65 |
| 3,520,669 | 7/1970 | Greenler et al. | 65/182.5 X |
| 3,540,872 | 11/1970 | Oster | 65/182.5 X |
| 3,584,477 | 6/1971 | Hainsfurther | 65/182.5 |
| 3,594,147 | 7/1971 | Galey et al. | 65/182.5 |
| 3,594,148 | 7/1971 | Smith et al. | 65/182.5 |
| 3,652,251 | 3/1972 | Brichard | 65/182.5 |
| 3,652,252 | 3/1972 | Javaux | 65/182.5 X |
| 3,655,356 | 4/1972 | Javaux | 65/182.5 |
| 3,669,640 | 6/1972 | Brichard et al. | 65/182.5 |
| 3,749,564 | 7/1973 | Brichard | 65/182.5 X |
| 3,767,375 | 10/1973 | Brichard et al. | 65/347 X |
| 3,800,014 | 3/1974 | Brichard | 65/182.5 X |
| 3,854,922 | 12/1974 | Sensi et al. | 65/182.5 X |
| 4,741,749 | 5/1988 | Sensi et al. | 65/99.2 |
| 4,744,809 | 5/1988 | Pecoraro et al. | 65/135 |
| 4,836,841 | 6/1989 | Sorg et al. | 65/347 |

Primary Examiner—Robert L. Lindsay
Attorney, Agent, or Firm—Dennis G. Millman

[57] ABSTRACT

In a float glass chamber, particularly in a region operating at higher than usual temperatures, integrity of the bottom structure is sustained by employing wedge shaped bottom blocks that are maintained in compression by externally applied mechanical forces. The arrangement permits the use of a bi-layer bottom construction with a high alumina upper course and a clay bottom course.

18 Claims, 1 Drawing Sheet

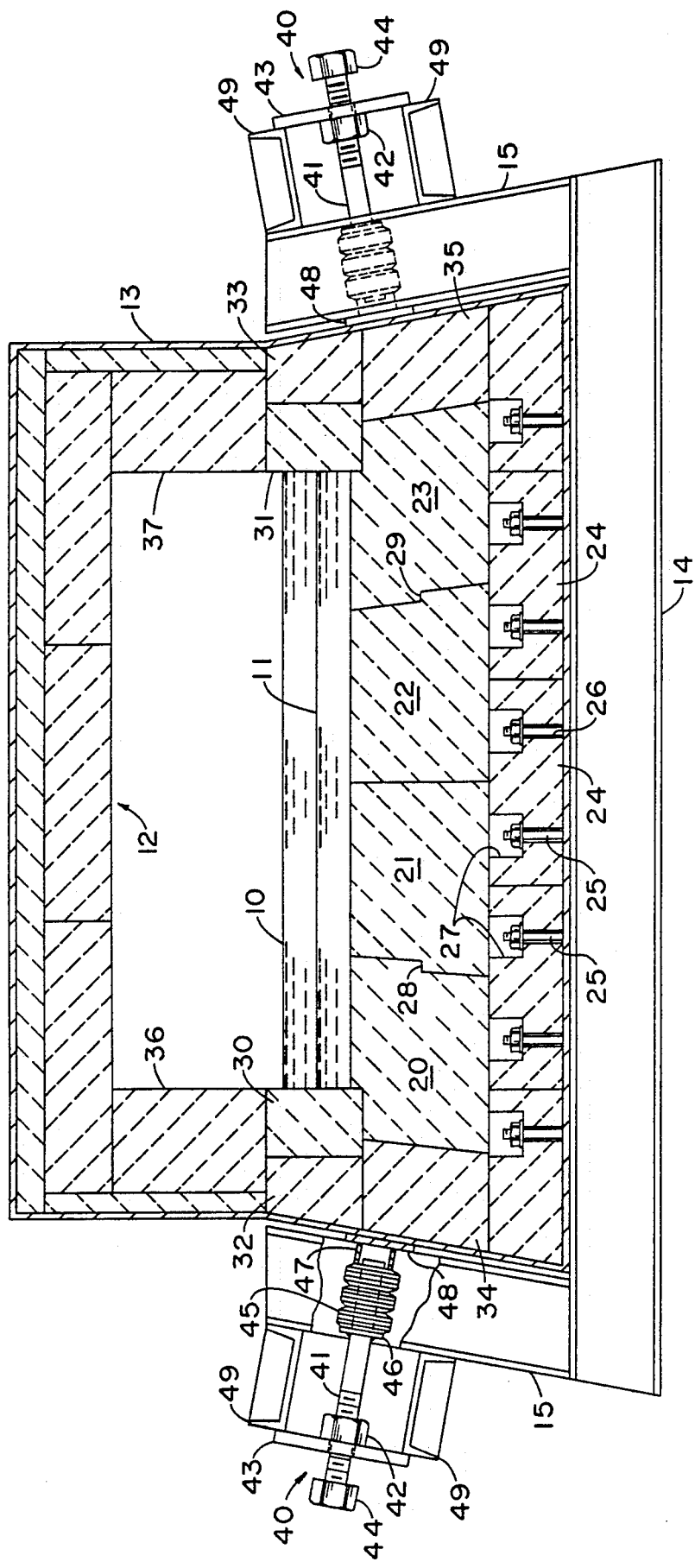

COMPRESSED, WEDGED FLOAT GLASS BOTTOM STRUCTURE

BACKGROUND OF THE INVENTION

This invention is an improvement in the structure adapted to contain a pool of molten metal on which molten glass is floated as it is being formed into a flat glass ribbon in the float process. In particular, it involves a structure that is capable of maintaining integrity at higher temperatures than are customary in the float process.

A float glass forming chamber typically includes a steel casing lined with ceramic refractory material of sufficient thickness to provide a temperature gradient that places the exterior side of the refractory at a temperature below the melting temperature of the molten metal, which is usually tin or an alloy thereof. The object is to prevent the migration of molten tin into contact with the steel casing which would be readily attacked by the molten tin. The refractory lining takes the form of preformed and prefired blocks bolted to the bottom of the casing by bolts or the like as shown in U.S. Pat. Nos. 3,584,477 (Hainsfurther), 3,652,251 (Brichard), and 3,669,640 (Brichard et al.), or a layer cast in place around anchors affixed to the casing as shown in U.S. Pat. No. 3,594,147 (Galey et al.). The mechanical attachments of the refractory lining to the casing are required to prevent the buoyant force of the molten tin from lifting the refractory out of place since the specific gravity of the tin is much greater than that of the refractory.

Avoiding the use of individual bolts or anchors would be advantageous in that it eliminates several potential sources of failure. Bolt holes in some arrangements need to be filled with a separate refractory material that can come loose and interfere with the forming process. Attack of tin on the bolts or anchors can be a source of bubbles that degrade the quality of the glass. Mechanical attachments can also be the source of cracks, particularly at higher temperatures. Moreover, refractories that are suited for higher temperature applications tend to be more brittle and therefore can be more easily fractured by the localized stresses produced by bolts or anchors.

An arrangement without direct mechanical attachment of the refractory bottom blocks to the casing is shown in U.S. Pat. No. 3,427,142 (De Lajarte). There, wedge shaped center blocks are held in place by the adjacent blocks, and the outer blocks are restrained vertically by an extension of the metal casing over the tops of the outer blocks. However, the wedged block arrangement of the patent has been found to be inadequate as an alternative to the usual mechanical attachments such as bolts or anchors. This is because the very large buoyant force of the small amount of molten tin that penetrates between the blocks is sufficient to lift the center blocks, opening gaps therebetween that provide enlarged paths for the molten tin to attack the casing and to lift the blocks further. Additionally, the structure disclosed in that patent can provide a proper, tightly wedged fit at only one temperature since the thermal expansion and contraction that accompany normal temperature variations during operation would not be accommodated, much less the large temperature changes involved in starting up or shutting down the operation. If the casing and blocks are sized to fit at peak operating temperatures, gaps will open and the blocks will lift when production interruptions cause the temperature to drop. On the other hand, sizing the casing and blocks for a lower temperature will cause excess stress and possible cracking of the blocks, particularly blocks of high temperature durability refractory such as high alumina refractories.

Processes that put exceptional stress on the molten tin containment structure are disclosed in U.S. Pat. Nos. 4,741,749 (Sensi et al.) and 4,744,809 (Pecoraro et al.). In these processes the molten glass is deposited onto the molten tin at temperatures substantially higher than in a conventional float process. Tin temperatures where the glass is first received onto the tin may be as high as 2300° F. (1260° C.), which may be compared to a conventional delivery region tin temperature of about 1900° F. (1040° C.). At conventional temperatures the tin containing vessel may be made of clay type refractories containing alumina and silica as disclosed in U.S. Pat. No. 3,594,148 (Smith et al.). But at higher temperatures the clay type of refractory is subject to accelerated attack by alkalis present, which can lead to bloating, shelling, and delamination of the bottom refractories. At the higher temperatures, using more suitable refractories such as high alumina refractories would be preferred as taught by U.S. Pat. No. 3,669,640 (Brichard et al.), but this type of refractory is more brittle and subject to fracture when subjected to mechanical stress. The usual attachment means can lead to stress being applied to the refractory as temperatures change, thereby increasing the likelihood of fracture. The extra refractory thickness and the large temperature gradient required by a high temperature operation also increase the amount of stress that may be created in the refractory. Therefore, the use of refractories with suitable chemical durability for the high temperature environment heretofore entailed accepting a high risk of bottom failure due to refractory fracture.

SUMMARY OF THE INVENTION

The present invention provides a containment structure for molten metal (e.g., tin) and molten glass that is adapted for use at high temperatures. Structural integrity is maintained by compressing wedged, bottom refractory blocks together with compliant force that accommodates expansion and contraction. The bottom blocks have sides that slope inwardly and upwardly so as to fit together in the nature of an inverted, flat arch. The wedge shapes and the laterally applied compressive force cooperate to prevent gaps from opening between the blocks thereby restraining the blocks against being lifted by the buoyant force of the molten metal. Advantageously, this restraint is affected without engaging each block with mechanical fastener means. Therefore, bolts and anchors are not needed, and the stresses they can induce are avoided. The possibility of attack of molten metal on metal fastening hardware is also eliminated. Additionally, the refractory blocks need not include plugs that may come loose. Even if cracks should occur, the compressive force helps to maintain integrity of the bottom. Preferably, the lateral compressive force is applied by way of resilient means such as springs that can maintain the compression over a range of expansion and contraction.

The absence of individual bottom block attachment means in the structure of the present invention permits greater flexibility in design. A particular benefit is the implementation of a practical two-layered bottom design. The upper, tin-contacting layer may be a high temperature durable refractory, and the lower layer may be a different refractory selected primarily for its insulating value. The compressed wedge design of the present invention permits the upper layer to be retained tightly in place independently from the lower layer and without direct connection to the casing. The lower layer may also be wedged, or it may be affixed to the casing in a conventional manner. As a result of the two layer design, the upper, high temperature refractory pieces may be smaller in thickness, thereby reducing the potential for cracking. The two layer design also permits joints to be offset from each other, thereby making a more tortuous path for any tin leaks.

The structure of the present invention enables containment of molten metal in the context of a float glass forming operation at tin temperatures in excess of 2000° F. (1100° C.), for example at temperatures of about 2300° F. (1260° C.).

THE DRAWING

The FIGURE is a transverse, cross-sectional view of a float glass forming chamber incorporating the features of the present invention.

DETAILED DESCRIPTION

An example of a specific embodiment of the present invention as shown in the drawing will be described in detail in order to present the best mode of carrying out the invention known to the inventors. It should be understood that the invention is not limited to this specific embodiment.

The FIGURE shows a portion of a float glass forming chamber in which molten glass 10 is supported on a pool of molten tin 11. The molten glass is deposited onto the tin at one end of the chamber and removed at an opposite end, so that molten glass moves in the longitudinal direction through the chamber, i.e., in the direction of view of the FIGURE. The greatest utility for the present invention is in the vicinity of the end of the chamber where the glass is deposited onto the tin because that is usually the region of highest temperatures, but could be applied to advantage in any region of the forming chamber. The invention is also useful in a region where molten glass is stirred while supported on molten tin as disclosed in U.S. Pat. No. 4,744,809 (Pecoraro et al.). There, as well as the initial delivery zone of molten glass onto molten metal in an arrangement such as that disclosed in the aforesaid U.S. Pat. No. 4,741,749 (Sensi et al.), implementation of the present invention is aided by the relatively narrow width of the chamber in that region.

The roof 12 is shown schematically in the FIGURE since it forms no part of the present invention, and roof structures of various types for float chambers are well known in the art and are commercially available. The bottom and sides of the chamber may be enclosed by a casing 13. In a conventional float forming chamber, substantially the entire chamber may be enclosed by a gas-tight casing in order to maintain a relatively non-oxidizing atmosphere within the chamber to prevent oxidation of the molten metal. Provision of a non-oxidizing atmosphere may not be necessary where molten glass covers the surface of the molten metal. The casing 13 is usually comprised of steel. Steel beams 14 or the like support the chamber. Rising from the support beams 14 in the embodiment shown are side restraining beams 15 on opposite sides of the chamber. The side restraining beams 15 provide a rigid foundation for the lateral compression means of the present invention. It should be apparent that any rigid structure along the sides of the chamber may serve as the foundation for the compression means and that the invention is not limited to the particular beam structure shown. The side restraining beams 15 are not connected directly to the casing 13. It is also unnecessary for there to be attachment between the casing 13 and the beams 14, although it may be preferred to keep the structure centered by providing attachment at the center of the bottom of the casing 13 to the beams 14. The pair of side restraining beams 15 shown in the drawing may be only one of several that may be spaced along the length of a float chamber.

The embodiment depicted in the FIGURE includes the preferred feature of two refractory layers on the bottom, a high temperature course of blocks 20, 21, 22, and 23, and an underlying course of blocks 24 having relatively higher thermal insulating value but less thermal durability. It should be understood that the broader aspects of the invention can apply to a bottom having a single course of blocks. Instead of blocks 24, the lower layer could be cast in place with refractory cement. As another alternative, the lower course of blocks could be wedged and compressed in the same manner as the upper course. However, a more conventional attachment arrangement for the lower course is deemed adequate for most purposes because the upper course provides protection against penetration of high temperature tin into the attachment means of the lower course. As shown, the lower blocks 24 are held in place by means of a plurality of threaded studs 25 welded to the casing 13. The studs 25 align with bores 26 and counterbores 27 in the blocks 24 whereby washers and nuts on the studs secure the blocks 24 in place. The lower blocks 24 may be of the same type of refractories that are employed in conventional float glass bottoms, i.e., those that have an upper service temperature limit of about 1900° F. (1040° C.), for example alumina-silica clay type refractories. The thickness of the upper course of blocks 20, 21, 22, and 23 should be chosen so as to provide sufficient thermal gradient so that the upper surface of the lower blocks 24 are at a temperature no higher than their recommended upper service limit. The thickness of the lower blocks 24 should be chosen to provide a reasonable bottom casing temperature, e.g., about 250° F. (120° C.) or less. When using high alumina refractories for the upper blocks 20, 21, 22, and 23 and clay refractories for the lower blocks 24, the thickness of the upper course is typically about twice that of the lower course. The precise thicknesses will, of course, depend upon the particular refractory products used. An example of a product suitable for the upper blocks 20, 21, 22, and 23 is Ultracast 90 sold by Thermal Ceramics Company, which is a high alumina refractory characterized by an alumina content in excess of ninety percent. Another attribute of this refractory that lends itself for use in the upper course is its low silica content, which is less than 4 percent. An example of a suitable material for the lower course is BFI-71 sold by Findlay Refractory Co., which is a conventional bath bottom clay refractory comprised chiefly of about 41 percent alumina and 53 percent silica by weight. This clay refractory composition is merely an example since considerable leeway in the composition of the lower course is permitted by the present invention.

Blocks 20, 21, 22, and 23 are the primary components of the inverted flat arch of the present invention. Their number is not significant, but it is preferred to make them as large as possible to minimize the number of joints, within the dimensional limitations imposed by the tendency of large blocks to be prone to fractures. Each of these blocks is wedge shaped, that is, at least one dimension of its base is larger than the corresponding dimension of its top. When these blocks are fitted together with their sides in contact with each other, an overlapping relationship results, with the outer blocks overlapping the inner blocks, whereby no block is free to move upwardly. Various complex shapes could achieve the overlapping relationship, but to simplify fabrication and to avoid providing fracture initiation sites, it is preferred to use relatively simple sloped sides on the blocks. Each block has at least one non-vertical side sloped upwardly and inwardly so that the planes defined by a pair of opposite sides intersect at a line above the top of the block. In other words, each block is a truncated, upwardly pointed wedge. It is preferred that the arch span the shortest dimension of the chamber, which may be termed the transverse direction. Therefore, it is preferred that the transverse sides of the blocks be the sloped sides. The closer to the sides of the chamber, the greater will be the angle from vertical of the sloped sides. The ship-lap joints 28 and 29 shown between blocks 20 and 21 and between blocks 22 and 23 are optional, their presence providing additional resistance against lifting of the center blocks if desired. Instead of the vertical center joint shown between blocks 21 and 22, a central block configured as an inverted key block may be employed to some advantage.

Perimeter blocks 30 and 31 are preferably made of a refractory having high temperature durability and compatibility with molten glass since they are in contact with the molten tin as well as molten glass, but outer side blocks 32, 33, 34, and 35 may be a lower durability, higher insulating value refractory similar to the lower bottom blocks 24. Side blocks 34 and 35 may be held down by the weight of the side walls 36 and 37 and the roof, or connection may be made to the casing by way of threaded studs as with blocks 24. Side blocks may be of the same material as the upper course 20, 21, 22, and 23, although lower durability refractory may used instead.

The joints between the bottom blocks 20, 21, 22, and 23 must be maintained tight to prevent lifting or tilting of the blocks. A small amount of tin penetration into the joints can be tolerated, but displacement of the blocks can produce large openings for tin penetration that can cause process upsets and failure of the metal casing 13. Because the melting temperature of tin, at 450° F. (232° C.), is much lower than the operating temperatures, and because wide fluctuations in temperature occur, the tightness of the joints must be maintained against penetration of molten tin over a wide range of temperatures. A temporary disruption of molten glass flow into the chamber can result in a temperature drop of several hundred degrees. Even greater temperature changes are involved in starting up or shutting down the process. Thermal expansion or contraction of the bottom structure at these times is substantial, and without the provisions of the present invention can lead either to gaps opening between blocks, which would permit the blocks to be lifted, or to stresses that could fracture the blocks. Both are avoided in the present invention by providing means to adjustably control the compressive force in at least the upper course of bottom blocks.

The compression applying means in the embodiment shown in the drawing includes a pair of transversely opposed bucking screws 40 that bear against the sides of the chamber. Each bucking screw 40 is comprised of a threaded shaft 41 threaded through a nut 42 welded to a bearing plate 43. A nut 44 may be welded onto the outer end of the threaded shaft 41 so as to be engaged by a wrench for turning the shaft. The bearing plate is rigidly affixed to a structural member separate from the chamber casing 13, an example of which is the side restraining beam 15 in the arrangement illustrated. The plate 43 may be attached to the beam 15 by way of spacer frame members 49. The shaft 41 could bear directly onto the side of the chamber and could be adjusted to maintain a constant compressive force on the bottom blocks, but to avoid continuous attention it is preferred to provide a resilient connection between the shaft and the chamber side. This may be provided by any type of spring or the like, but because of the relatively small deflection and the large forces involved, the preferred type depicted is the tapered disc spring known as a "Belleville washer." To provide the desired spring force and deflection a plurality of the disc springs 45 are used together in a stack on each shaft 41 compressed between a collar 46 (welded to the shaft 41) and a socket 47 within which an end of the shaft 41 is freely received. The socket 47 may be fastened to a bearing pad 48 affixed to the side of the casing 13 for the sake of distributing the force over an area of the side. The compression force is applied to the side of the casing at approximately the elevation of the upper course of bottom blocks, preferably above their centers. A pinching effect can be maximized by applying the compression force near the elevation of the upper surface of the bottom. The casing 13 is preferably not attached to the side restraining beams 15 and need not be attached to the support beams 14 except at the center of the bottom so that the pinching action can take place freely by permitting upward and inward flexing of the entire bottom structure.

Several of the disc springs 45 may be stacked in the same direction to achieve a higher combined spring constant or opposed to provide more deflection. In the example shown in the drawing, groups of disc springs stacked in the same direction are used in combination with other groups facing the opposite direction. The particular number and arrangement of the disc springs depends upon the properties of the spring product being used and the amount of force required. The amount of force required to overcome the buoyant force of molten tin on the blocks will, in turn, depend upon the particular size and design of the chamber bottom. As an example, the requirement for the specific arrangement shown was calculated to be 25,000 pounds per foot of length of the chamber, and the springs were chosen to provide in excess of that value throughout a total deflection of one half inch (1.25 centimeters) on the springs on each bucking screw. This deflection is considerably larger than the actual expansion and contraction of the bottom blocks so as to provide a margin of safety. Preferably, the springs provide sufficient force over the deflection range that accompanies normal operation so that the shafts 41 need be adjusted only during major operational changes such as starting up or shutting down.

The sides of the bottom structure and the casing 13 shown in the drawing slope inwardly. This is an optional feature that serves to prevent the entire bottom from lifting upwardly. This function could be served instead by a clip or peg extending inwardly from a vertical sided casing. None of these is needed if side blocks 34 and 35 are adequately restrained from upward movement by the weight of the upper side walls or by friction with the transverse compression applied. The bucking screws 40 in the illustrated embodiment extend normal to the side walls of the chamber and therefore are at a small angle to the horizon. Although this may be of some assistance to the pinching effect, it is not essential. With sloped sides or vertical sides, the bucking screws could extend horizontally.

Other variations and modifications as are known to those of skill in the art may be resorted to without departing from the scope of the invention as defined by the claims that follow.

We claim:

1. Apparatus for containing molten glass supported on molten metal comprising: a chamber having a bottom and side wall portions of refractory material suitable for contact with molten metal; the bottom including a row of refractory blocks in face-to-face abutment, each of the blocks having at least one of the abutting faces sloped so as to configure the block as an upwardly pointing, truncated wedge; pressure applying means external to the chamber at each end of the row bearing against a wall portion of the chamber that is sufficiently deformable to transmit pressure to the row of blocks for maintaining the row under compression so as to prevent upward displacement of the blocks due to molten metal migration around the blocks over a wide range of temperatures.

2. The apparatus of claim 1 wherein the pressure applying means includes adjustable force means alongside the chamber.

3. The apparatus of claim 2 wherein the adjustable force means includes screw means oriented substantially parallel to the row.

4. The apparatus of claim 3 wherein the adjustable force means additionally includes spring means for resiliently imparting the compressive force to the row of blocks.

5. The apparatus of claim 1 wherein the pressure applying means includes spring means for resiliently imparting the compressive force to the row of blocks.

6. The apparatus of claim 1 wherein the chamber is relatively long in the longitudinal direction and relatively short in the transverse direction, and the row of blocks extends in the transverse direction.

7. The apparatus of claim 6 wherein the chamber is comprised of a plurality of said rows and a plurality of pressure applying means are spaced longitudinally along the chamber sides.

8. The apparatus of claim 1 wherein the row of blocks comprises an upper course of a bottom structure that includes a plurality of courses.

9. The apparatus of claim 8 wherein the upper course includes refractory different in composition from the refractory of an underlying course.

10. The apparatus of claim 9 wherein the refractory of the upper course has greater durability at operating conditions than the refractory of the lower course.

11. The apparatus of claim 10 wherein the refractory of the underlying course has greater insulating value than the refractory of the upper course.

12. The apparatus of claim 10 wherein the refractory of the upper course has a higher concentration of alumina than the underlying course.

13. The apparatus of claim 8 wherein a bottom course is attached directly to a bottom casing of the chamber.

14. The apparatus of claim 13 wherein the upper course is not attached to the bottom course.

15. The apparatus of claim 1 wherein the bottom is sheathed in a metallic casing, and the pressure applying means engage exterior side portions of the casing.

16. The apparatus of claim 15 wherein the side portions of the casing slope inwardly and upwardly toward the chamber.

17. The apparatus of claim 16 wherein the casing is free to pivot upwardly and inwardly with respect to the chamber in response to the pressure applying means.

18. The apparatus of claim 16 wherein the pressure applying means is adapted to apply force at an angle inwardly and downwardly toward the center of the row of blocks.

* * * * *